Figure 1:
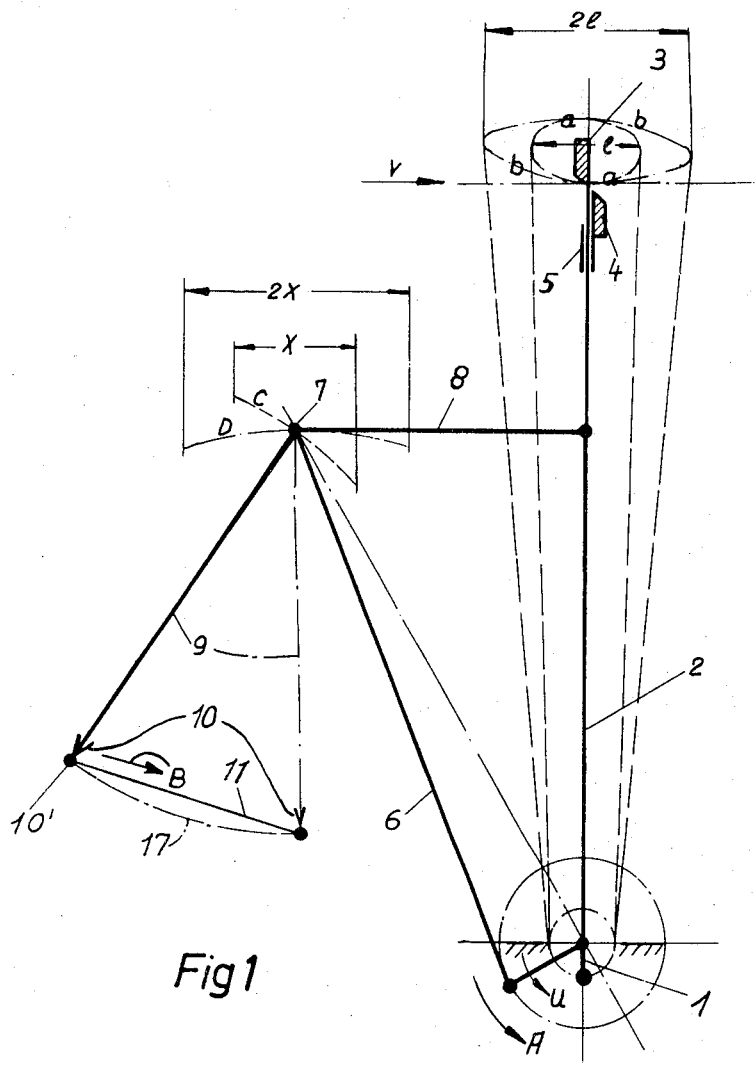

United States Patent

[11] 3,548,698

[72] Inventor Curt Muenchbach
Pforzheim-Sonnenberg, Germany
[21] Appl. No. 782,329
[22] Filed Dec. 9, 1968
[45] Patented Dec. 22, 1970
[73] Assignee Irma Ungerer (nee) Dollinger
F Pforzheim, Germany
[32] Priority Jan. 19, 1968
[33] Germany
[31] No. 1,652,789

[54] FLYING SHEARS
9 Claims, 2 Drawing Figs.
[52] U.S. Cl...................................................... 83/311,
83/316
[51] Int. Cl........................................................ B26d 1/56;
B23d 25/06
[50] Field of Search........................................... 83/311,
316, 317, 315

[56] References Cited
UNITED STATES PATENTS
2,800,179  7/1957  Muenchbach................  83/316

Primary Examiner—James M. Meister
Attorney—Polachek & Saulsbury

ABSTRACT: Knife means are operable by knife-driving means to move in a predetermined direction and to cut sections having a desired length from stock traveling in said predetermined direction at a desired speed. Said knife-driving means comprise knife rocker means connected to said knife means and a linkage comprising a connecting rod, a constraining rocker, a hinge connecting said connecting rod to said constraining rocker, a pivot mounting said constraining rocker at a point on a straight support spaced from said hinge, and a coupling rod connecting said hinge to said knife rocker means. Said knife-driving means also comprise eccentric drive means connected to said knife rocker means and to said connecting rod and operable to impart oscillating motions to said knife rocker means and by means of said connecting rod to said hinge. Said hinge is constrained to oscillate through a predetermined point. Said pivot is adjustable on said support about said predetermined point.

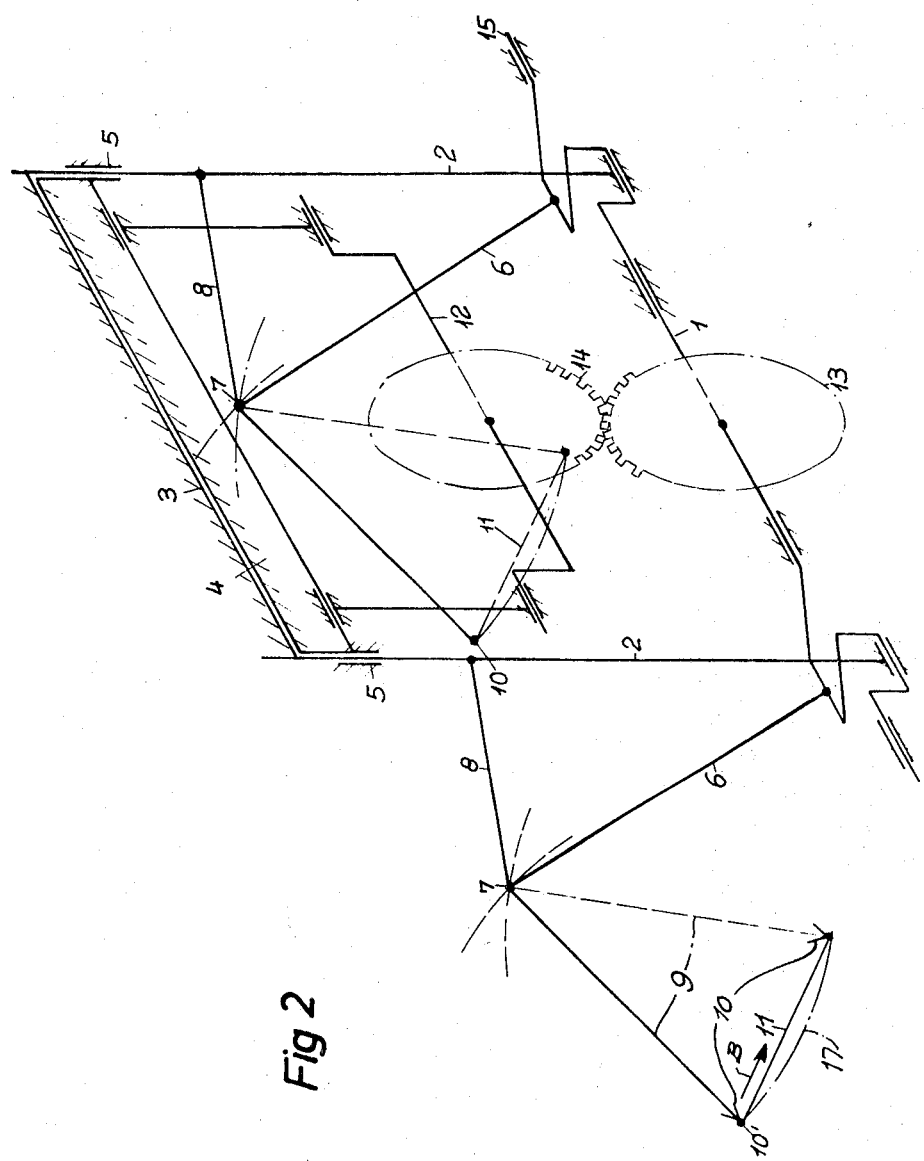

FLYING SHEARS

This invention relates to flying shears for cutting traveling stock, particularly metal strip, in which shears the knives are driven by means of a crank or eccentric to move in the direction of travel of the strip at an adjustable speed so that the length of the cut sections can be varied regardless of the speed of travel of the stock.

Flying shears for cutting traveling stock, particularly metal strip, comprise cutting knives which travel with the stock during the cutting operation. The speed at which the cutting knives travel with the stock to be cut must match the speed of travel of the stock in order to avoid an elongation or buckling of the stock. In known flying shears, motion is imparted to the knives, preferably to the upper knife, by a linkage, particularly one which comprises a slideway or rocker arm constraining the output member of the linkage to perform an arcuate motion, and the constraining means are adjustable relative to the crankshaft to vary the length of the cut sections. Owing to the adjusting housing, a relatively large mass is connected to the rocker of such shears and limits the speed at which the knives can travel with the stock so that the latter must not move at a speed in excess of about 100 meters per minute.

The present invention provides for flying shears a cutting knife mechanism which permits of much higher speeds of travel of the stock to be cut. The flying shears for cutting traveling stock, particularly metal strip, in which shears the knives are driven by means of a crank or eccentric to move in the direction of travel of the strip at an adjustable speed so that the length of the cut sections can be varied regardless of the speed of travel of the stock, are characterized in that the knife rockers, preferably of the upper knife, are connected by a coupling rod to the output hinge of a linkage, preferably one for imparting an arcuate movement to said hinge, whereby said coupling rod imparts a rocking motion to said rockers, and the rocker of the linkage is adjustable about the center of oscillation of the hinge to vary the stroke of the knives. As a result, there is no need to provide the knife rockers themselves with adjusting elements to change the speed at which the knives travel with the stock and the additional mass of such adjusting elements is avoided. This enables a considerable increase of the peripheral velocities.

When it is desired to vary the length of the sections to be cut from the stock, the strip speed is maintained and the crank speed is changed to effect a change of the speed of travel of the knives relative to the strip speed. In order to match the speed of travel of the knives with the strip speed, the pivot of the rocker of the linkage is subsequently adjusted so that the orbit of the knives is reduced or increased in size in accordance with the projection of the arc described by the hinge of the linkage into the plane of the strip. The speed of travel of the knives is thus reduced or increased. The pivot of the rocker of the linkage may be adjustable, e.g., by means of a screw, on the chord of an arc which is drawn around the hinge.

Specifically, motion may be imparted to the knives and to the linkage from a common shaft carrying angularly spaced cranks or eccentrics and the coupling rod between the hinge of the linkage and the knife rocker may be arranged to extend approximately at right angles to the knife rocker when the knives are in cutting position.

When the lower knife is guided on the rockers provided on both sides and mounting the upper knives, a cutting motion may be imparted to the lower knife in known manner by means of an eccentric or crankshaft. As a result, the cutting edges of the knives move always in the same plane relative to each other. Besides, there is no need for separate linkages mounting the lower knife. The upper and lower knives may be provided in known manner with oblique cutting edges in order to reduce the cutting pressure and the masses to be accelerated.

An embodiment of the flying shears according to the invention is shown by way of example in the drawing, in which:

FIG. 1 is a diagrammatic view showing the means for driving the upper knife with the rocker of the linkage in different positions and FIG. 2 is a diagrammatic view showing shears according to the invention.

As is apparent from the drawing, the upper knife 3 is driven by a crankshaft 1 and a rocker 2. The lower knife 4 is guided the rocker 2 at 5. According to the invention, the same crankshaft 1 is used to drive the connecting rod 6 of a linkage for producing an arcuate movement. The cranks for driving the rocker 2 and connecting rod 6 are angularly spaced. The hinge 7 of said linkage is connected to the rocker 2 by a coupling rod 8 to impart a rocking motion to the rocker 2. When the knives 3, 4 are in cutting position, the coupling rod 8 between the oscillating hinge 7 and the knife rocker 2 is approximately at right angles to the rocker 2. The pivot 10 of the rocker 9 of the linkage is adjustable about the center of oscillation of the hinge 7, in this case on the chord of an arc 17 of a circle drawn about the hinge 7; this change is effected, e.g., by means of a screw 10' movable in path B along straight pivot support 11 whose axis is a chord of arc 17.

When the mechanism has been adjusted as illustrated and the cranks of the crankshaft 1 revolve in the direction A, the upper knife 3 will describe the orbit $a-a$ having a major axis 1 and the oscillating hinge 7 will move on the path C having the horizontal projection X. If the pivot 10 is moved in the direction B on support 11, the oscillating hinge will finally move on the path D having the horizontal projection 2X so that the knives describe the orbit $b-b$ having a major axis 21. At a constant velocity $v$ of the strip the crankshaft speed may be reduced from $u$ to $\frac{u}{2}$ and the orbit of the knives from $a-a$ to $b-b$ so that the length of the cut strip sections is doubled while the knives travel at the same speed. This control is infinite. By a skipping of cuts, wider ranges of adjustment and lengths of cut sections may be obtained with these shears.

As is diagrammatically shown in FIG. 2, the lower knife 4 may slide in a guide 5 on the frame which is formed by the knife rockers 2 and the upper knife 3. The lower knife 4 is moved up and down by an eccentric shaft and is driven, e.g., by means of gears 13, 14 from the crankshaft 1, i.e., from the means for driving the upper knife. The power input to the flying shears is indicated at 15. To multiply the length 1 of the cut sections, meshing gears 13, 14 having different transmission ratios may be used.

I claim:

1. Flying shears, which comprise:
   knife-driving means and knife means operable by said knife-driving means to move in a predetermined direction and to cut sections having a desired length from stock traveling in said predetermined direction at a desired speed, said knife-driving means comprising knife rocker means connected to said knife means;
   a linkage comprising a connecting rod, a constraining rocker, a hinge connecting said connecting rod to said constraining rocker, a support, a pivot mounting said constraining rocker on said support at a point spaced from said hinge, and a coupling rod connecting said hinge to said knife rocker means; and
   eccentric drive means connected to said knife rocker means and to said connecting rod and operable to impart oscillating motions to said knife rocker means and by means of said connecting rod to said hinge, said hinge being constrained to oscillate through a predetermined point.

2. Flying shears as set forth in claim 1, in which said eccentric drive means comprise an eccentric connected to said connecting rod and operable to impart an oscillating motion to said hinge by means of said connecting rod.

3. Flying shears as set forth in claim 1, in which said eccentric drive means comprise a crank connected to said connecting rod and operable to impart an oscillating motion to said hinge by means of said connecting rod.

4. Flying shears as set forth in claim 1, in which:
   said knife means comprise upper and lower knives adapted to cooperate in cutting said stock; and
   said upper knife is carried by said knife rocker.

5. Flying shears as set forth in claim 1, in which said hinge is constrained to oscillate along an arcuate path.

6. Flying shears as set forth in claim 1, which further comprises a positioning member movable along said support to adjust said pivot on the chord of an arc which is drawn about said predetermined point.

7. Flying shears as set forth in claim 1, in which said knife-driving means comprise:
a common shaft;
first eccentric means connecting said shaft to said knife rocker; and
second eccentric means connecting said shaft to said connecting rod, said first and second eccentric means being angularly spaced on the axis of said shaft.

8. Flying shears as set forth in claim 1, in which said coupling rod is arranged to extend approximately at right angles to said knife rocker means when said knife means are in cutting position.

9. Flying shears as set forth in claim 1, in which:
said knife means comprise upper and lower knives;
said knife rocker means comprise two rockers, rigidly connected to said upper knife at opposite ends thereof;
said lower knife is guided at opposite ends on said knife rockers; and
said knife-driving means comprise eccentric drive means connected to said lower knife and operable to impart a cutting motion thereto.